(12) United States Patent
Cao et al.

(10) Patent No.: US 11,329,936 B1
(45) Date of Patent: May 10, 2022

(54) VISUAL REPRESENTATION OF SENDER DOMAIN INFORMATION AND E-MAIL ROUTING

(71) Applicant: Trend Micro Inc., Tokyo (JP)

(72) Inventors: Jing Cao, Nanjing (CN); Quan Yuan, Nanjing (CN); Bo Liu, Nanjing (CN)

(73) Assignee: TREND MICRO INC., Tokyo (JP)

( * ) Notice: Subject to any disclaimer, the term of this patent is extended or adjusted under 35 U.S.C. 154(b) by 0 days.

(21) Appl. No.: 16/852,015

(22) Filed: Apr. 17, 2020

(51) Int. Cl.
  *H04L 51/10* (2022.01)
  *H04L 51/234* (2022.01)
  *H04L 9/40* (2022.01)
  *H04L 29/06* (2006.01)

(52) U.S. Cl.
  CPC ............. *H04L 51/10* (2013.01); *H04L 51/34* (2013.01); *H04L 63/0428* (2013.01)

(58) Field of Classification Search
  CPC ...... H04L 51/10; H04L 51/34; H04L 63/0428
  USPC .......................................................... 709/206
  See application file for complete search history.

(56) References Cited

U.S. PATENT DOCUMENTS

2018/0227324 A1* 8/2018 Chambers ........... H04L 63/1441

OTHER PUBLICATIONS

Dwyer, Patrick, and Zhenhai Duan. "MDMap: Assisting users in identifying phishing emails." Proceedings of 7th annual collaboration, Electronic messaging, Anti-Abuse and spam conference (CEAS). 2010 (Year: 2010).*

Visualware, web document retrieved from http://www.emailtrackerpro.com/support/v9/htmlrep.html using Waybackmachine, Nov. 14, 2016 (Year: 2016).*

* cited by examiner

*Primary Examiner* — Nicholas R Taylor
*Assistant Examiner* — Chong G Kim
(74) *Attorney, Agent, or Firm* — Beyer Law Group LLP

(57) ABSTRACT

The system executes online on corporate premises or in a cloud service, or offline. An e-mail message is received at a server within a corporate network or cloud service. A header of the e-mail message is parsed to determine locations of server computers through which the e-mail message has traveled. Geographic locations are placed into a routing map. A banner is inserted into the e-mail message that includes the routing map or a link to the routing map. The routing map is stored by the e-mail gateway server at a storage location identified by the link. The modified e-mail message is delivered or downloaded from the e-mail server to a user computer in real time. The sender Web site is parsed to identify sender domain information to be inserted into the banner. If offline, a product fetches and modifies the e-mail message using an API of the e-mail server.

2 Claims, 12 Drawing Sheets

E-Mail Message Format

51 — Received: from SN1PR12CA0060.namedprd12.prod.outlook.com (2603:10b6:802:20::31) By BN8PR12MB3538.nameprd12.prod.outlook.com (2603:10b6:408:96::19) with Microsoft SMTP Server (version=TLS_2, cipher=TLS_ECDHE_RSA_WITH_AES_256_GCM_SHA384) id 15.20.2474.21; Mon, 25 Nov 2019 05:07:02 +0000

52 — Received: from MW2NAM10FT027.eop-nam10.prod.protection.outlook.com (2a01:111(400:7e89::206) by SN1PR12CA0060.outlook.office365.com (2603.10b6:802:20::31) with Microsoft SMTP Server (version=TLS_2, cipher=TLS_ECDHE_RSE_WITH_AES_256_GMC_SHA384)id 15.20.2474.16 via Frontend Transport; Mon, 25 Nov 2019 05:07:01 +0000

53 — Received: from sjdovmout04.udc.trendmicro.com (66.180.82.2) by MW2NAM10FT027.mail.protection.outlook.com (10.13.155.187) with Microsoft SMTP Server (version=TLS1_2, cipher=TLS_ECDHE_RSA_WITH_AES_256_GCM_SHA384)id 15.20.2474.17 via Frontend Transport; Mon, 25 Nov 2019 05:07:01 +0000

FIG. 2

E-Mail Routing Information in a Header

Visualization of E-Mail Message Routing in a Map

```
<meta property="og:url" content="https://www.trendmicro.com/en_hk/business.html"/>
<meta property="og:title" content="Enterprise Cybersecurity Solutions"/>
<meta property="og:description" content="Trend Micro is the global leader in enterprise data security and cybersecurity solutions for businesses, data centers, cloud environments, networks, and endpoints."/>
<meta property="og:site_name" content="Trend Micro"/>
<meta property="og:locale" content="en_HK"/>

<meta name="twitter:card" content="summary_large_image"/>
<meta name="twitter:site" content="@TrendMicro"/>
<meta name="twitter:title" content="Enterprise Cybersecurity Solutions"/>
<meta name="twitter:description" content="Trend Micro is the global leader in enterprise data security and cybersecurity solutions for businesses, data centers, cloud environments, networks, and endpoints."/>
```

Partial Source Code for Website "https://www.trendmicro.com"

FIG. 4

Visual Representation of Normal Domain

Visual Representation of Suspicious Domain

Banner in E-Mail Message with Visualization

VISUAL REPRESENTATION OF SENDER DOMAIN INFORMATION AND E-MAIL ROUTING

FIELD OF THE INVENTION

The present invention relates generally to e-mail security. More specifically, the present invention relates to visually displaying e-mail message data to aid in screening e-mail.

BACKGROUND OF THE INVENTION

Today e-mail has become an indispensable part of our lives and business. People access e-mail messages from almost anywhere, and from almost any device. E-mail is also an important official communication channel in business. Millions of business transactions are discussed and deals are closed using e-mail every year.

Therefore, e-mail security issues are some of biggest threats to an organizations' productivity and profitability. From annoying spam, phishing attacks and ransomware to Advanced Persistent Attacks, these threats to e-mail security will cost millions of dollars in lost business and damaged reputation to organizations.

Although many technologies are available to detect and prevent these threats to e-mail security, some e-mail messages are legitimate and must be allowed to reach a user in a timely manner; in other words, there should be a trade off between detection rate of actual malicious messages and false positives. The more information we know (or the user knows), the more accurate the detection can be. E-mail security software can be quite accurate in flagging or removing malicious messages, but, nevertheless, some critical knowledge is only known by the user, the recipient of the e-mail message. And, it may not be until the user receives the message that this knowledge can be brought to bear. For example, a new e-mail message sent from a stranger may be flagged as suspicious, (or deleted by e-mail security software), but in actuality it is a potential customer inquiry after offline consulting or after online SNS chatting. This information may only be known to the user, and originate in different places, such as online and offline, mailbox and SNS, personal and official mailboxes, etc.

Therefore, an e-mail security system and technique is desired that can not only reduce threats to e-mail security, but also allow a recipient to use his or her knowledge to make a decision regarding an e-mail message.

SUMMARY OF THE INVENTION

To achieve the foregoing, and in accordance with the purpose of the present invention, a system is disclosed that provides an effective and visual representation of sender domain information and e-mail routing to a user in order to detect malicious e-mail messages or to allow benign messages.

In a first embodiment, the system executes online on corporate premises or under corporate control. An e-mail message is received at an e-mail gateway server within a corporate network. A header of the e-mail message is parsed to determine geographic locations of server computers through which the e-mail message has traveled. Geographic locations are placed into a routing map showing a path. A banner is inserted into the e-mail message that includes the routing map or a link to the routing map. Next, the routing map is stored by the e-mail gateway server at a storage location identified by the link. The modified e-mail message is delivered from the e-mail gateway server to an e-mail server of the corporate network in real time.

In a second embodiment, the system executes online at a cloud service. An e-mail message is received at a cloud service. A header of the e-mail message is parsed to determine geographic locations of server computers through which the e-mail message has traveled. Geographic locations are placed into a routing map showing a path. A banner is inserted into the e-mail message that includes the routing map or a link to the routing map. Next, the routing map is stored by the e-mail server at a storage location identified by said link. The modified e-mail message is downloaded from the e-mail server to a user computer of a corporate network in real time.

In a third embodiment, the system executes offline on corporate premises or under corporate control. An e-mail message is fetched from an e-mail server using an API. A header of the e-mail message is parsed to determine geographic locations of server computers through which the e-mail message has traveled. Geographic locations are placed into a routing map showing a path. A banner is inserted into the e-mail message that includes the routing map or a link to the routing map, using an API of the e-mail server. Next, the routing map is stored by an e-mail security product at a storage location identified by the link.

In a fourth embodiment, the system executes offline at a cloud service. An e-mail message is fetched from an e-mail server using an API. A header of the e-mail message is parsed to determine geographic locations of server computers through which the e-mail message has traveled. Geographic locations are placed into a routing map showing a path. A banner is inserted into the e-mail message that includes the routing map or a link to the routing map, using an API of the e-mail server. Next, the routing map is stored by an e-mail security product at a storage location identified by said link. The modified e-mail message is downloaded from the e-mail server to a user computer of a corporate network.

BRIEF DESCRIPTION OF THE DRAWINGS

The invention, together with further advantages thereof, may best be understood by reference to the following description taken in conjunction with the accompanying drawings in which:

FIG. 2 is shows e-mail routing information from a header of an incoming e-mail message.

FIG. 4 illustrates partial source code from the home page of the Web site "https://www.trendmicro.com."

DETAILED DESCRIPTION OF THE INVENTION

It is realized that an incoming e-mail message can reveal information that will be useful to a recipient in determining whether or not the message is malicious. An understanding of the components of an e-mail message is useful in identifying this information and determining how best to use it.

Figure 1:
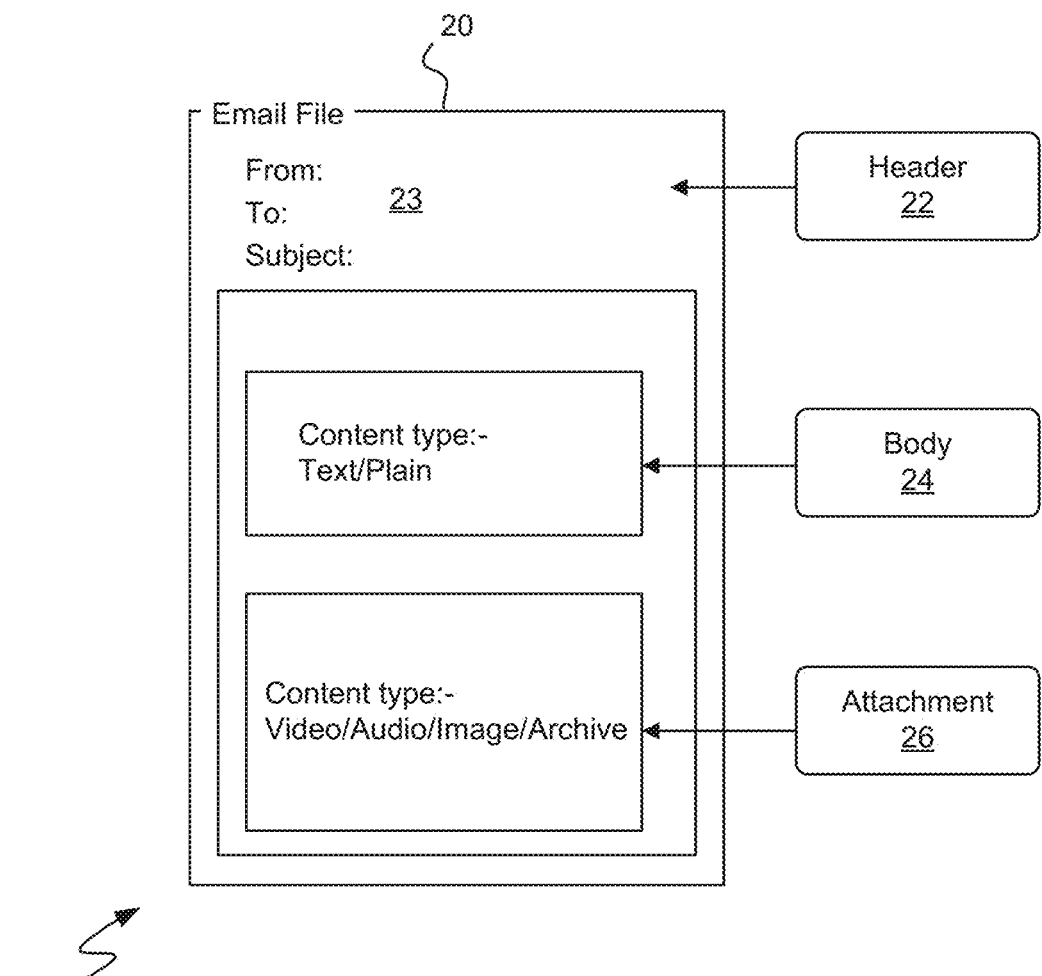
FIG. 1 is a block diagram of a typical e-mail message format.

FIG. 1 is a block diagram of a typical e-mail message format 10. An e-mail message 20 typically includes a header 22, a body 24 and optionally a number of attachments 26. The e-mail message may be referred to as a message, file, etc., depending upon how a particular e-mail server stores and delivers the message. As shown, header 22 includes From, To, and Subject 23. Most e-mail clients will show the entire body and attachments but only parts of the header 22, such as: From, To, CC, BCC. Some useful header information will not be shows to users, such as the e-mail routing information.

FIG. 2 shows e-mail routing information from a header of an incoming e-mail message. Shown is a series of received headers 51-53, which, among other information, include IP addresses 41-45. These received headers and the IP addresses form a list of server computers through which the e-mail message traveled in order to reach the recipient computer. Version information 52 and 54 shows that the connection between two server computers is encrypted. Thus, analysis and parsing of such e-mail routing information reveals not only the IP addresses of all the computers through which an e-mail message has traveled from sender to recipient, but also whether or not a connection between two server computers is encrypted or not. It is further realized that such e-mail routing information may be represented in a visual way in order to assist a recipient user with making a determination about whether or not a message is malicious.

Figure 3:
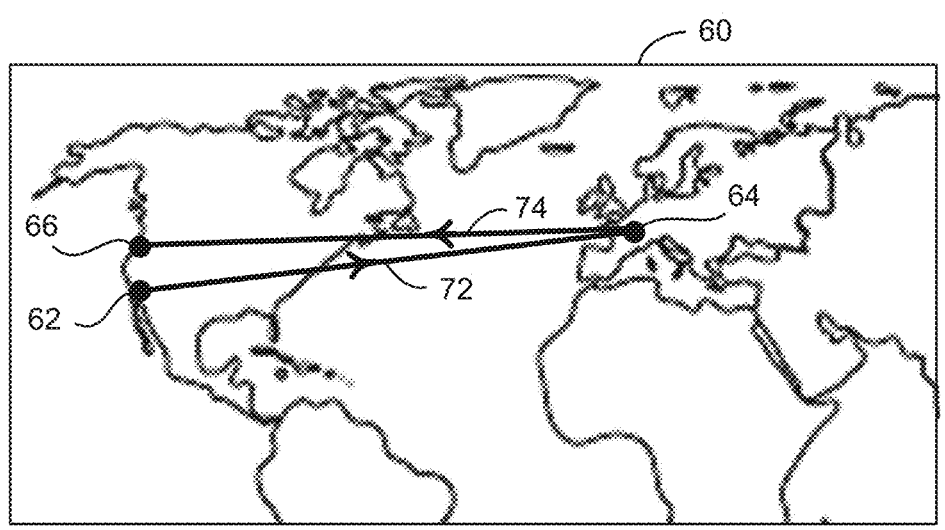
FIG. 3 is a graphic visualization of e-mail routing information in a geographical map.

FIG. 3 is a graphic visualization of e-mail routing information in a geographical map 60. Each circle 62-66 represents the geographic location of one of the server computers through which the message traveled (based upon its IP address), while lines 72 and 74 represent a connection between two server computers and the direction of travel of the e-mail message, and an indication of whether the connection is encrypted or not. That is, map 60 illustrates source and target server computers based upon the IP addresses from header 32. Many hops between server computers may indicate a suspicious e-mail message and server computers in suspect regions or countries may also indicate a suspicious e-mail message.

Different colored lines may be used to represent encrypted or not, e.g., red lines for not encrypted and green lines for encrypted. Other graphic effects may also be used instead of color to indicate encryption such as different icons for encryption or not, different size lines, etc. Generally, an encrypted connection indicates that an e-mail message cannot be tampered with en route.

Other useful information is found in the Web site of the sender domain. For any sender's e-mail address, take "abc@example.com," to determine the Web site: prepend http://, https://, http://www., or https://www. to the domain name, so the Web site of "example.com" should be http://example.com, https://example.com, http://www.example.com or https://www.example.com. We can provide an image of some of the Web site information to the user, so that the user can easily know to which kind of organization the sender belongs. It is further realized that most official, legitimate Web sites will use Search Engine Optimization (SEO) techniques, so there will be special HTML tags such as "description", "og:description" or "twitter:description" or other in the source code of the home page.

FIG. 4 illustrates partial source code 80 from the home page of the Web site "https://www.trendmicro.com." Shown are these special HTML tags 82 and 84 found within the source code. These HTML tags are used to briefly introduce a Web site and provide text for our use (shown as "content"). We can combine this information into a visual representation using this sender domain information.

Figure 5:
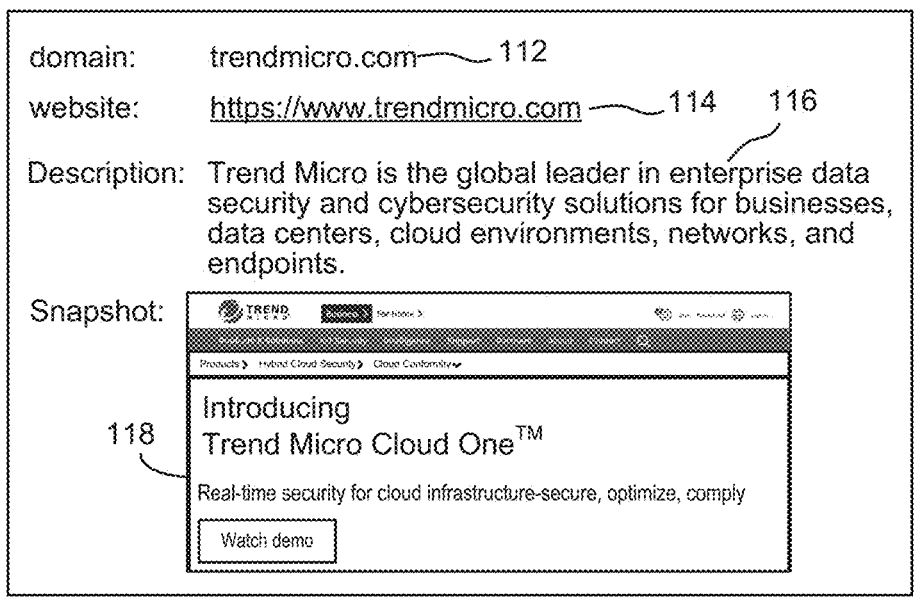
FIG. 5 is an example of a normal domain.

FIG. 5 is an example 110 of a normal domain. Shown in graphic image 110 is other information obtained via the e-mail address of the sender. Shown is the domain 112, the Web site 114 of that domain, a description 116 of the organization taken from source code on its Web site, and a possible snapshot 118 obtained from the Web site (e.g., from the splash page). Such an image may be produced and displayed within the body of the received e-mail message, in a thumbnail incorporated within the e-mail message, or displayed via a link included within the e-mail message.

Figure 6:
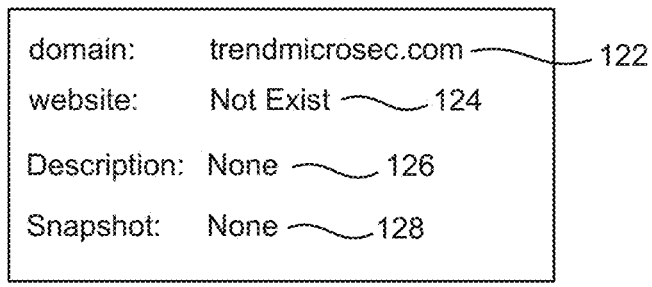
FIG. 6 is an example of a suspicious domain.

FIG. 6 is an example 120 of a suspicious domain. Shown in graphic image 120 is other information obtained via the e-mail address of the sender. Shown is the domain 122, the Web site 124 of that domain which does not exist, a description 126 which also does not exist, and a snapshot 128 which does not exist because the Web site does not exist. Although the domain "trendmicrosec.com" seems normal and seems to have a relationship to Trend Micro, Inc., a legitimate company, image 120 shows clearly that the domain is suspicious. Thus, with such a visual representation, a user can easily confirm that such a domain is suspicious, and then deduce that the e-mail message from such a sender is also dangerous.

Figure 7:
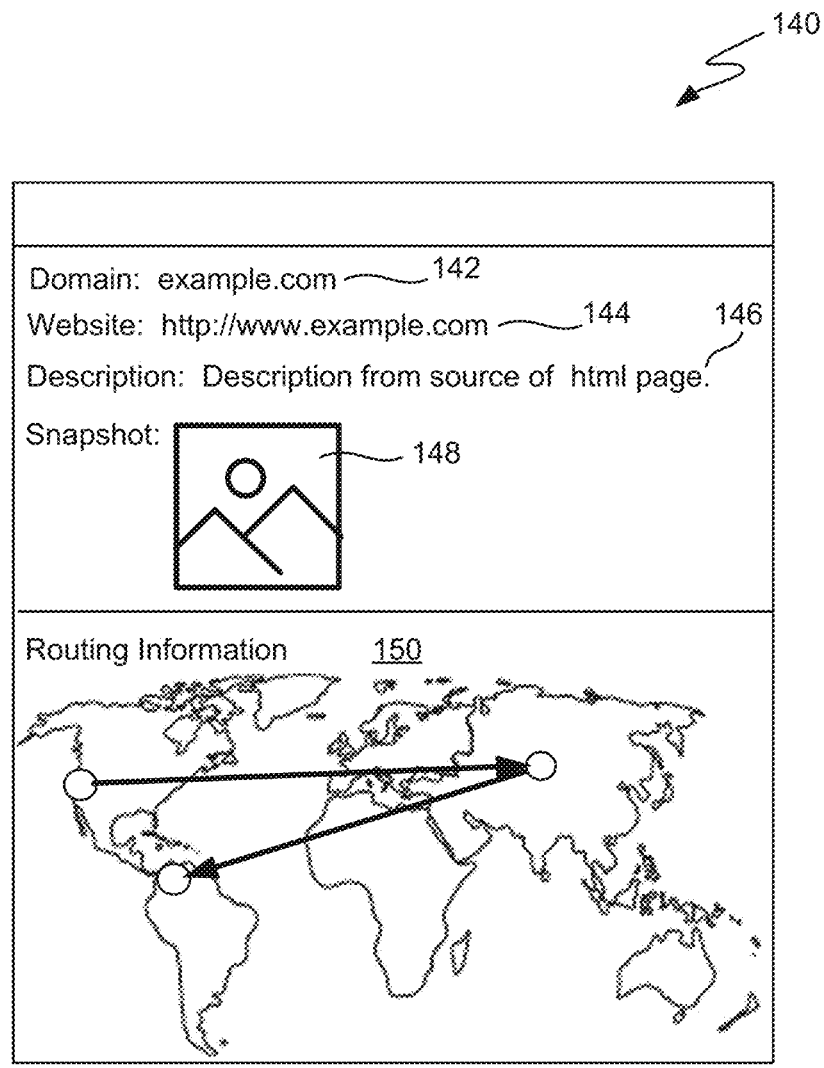
FIG. 7 presents a final visualization using sender domain information and e-mail routing.

FIG. 7 presents a final visualization 140 using sender domain information and e-mail routing. Shown in image 140 is a domain 142, the Web site 144, and a description 146, and a snapshot 148, all obtained via the sender e-mail address as has been explained above. Included within the same image 140 (or optionally presented as a separate image) is a visual representation 150 of the geographic routing of the received e-mail message showing the locations of the server computers through which the e-mail message passed, the direction of travel, and color-coded lines (or other graphic coding) indicating whether or not a particular connection was encrypted.

With such an image included, attached or linked to a received e-mail message, now a recipient user can easily know: 1) whether the sender's organization exists or not in the real world; 2) whether the sender's organization has a relationship with the user's work or not; 3) whether the sender's organization is consistent with the e-mail content or not; 4) whether the e-mail message is sent from a familiar place or country; 5) whether the e-mail message is delivered through secure channels or not; and, 6) whether the e-mail message is delivered through a suspicious place or country. With the above information presented visually, the user can resolve any e-mail message security issue using their own knowledge.

Figure 8:
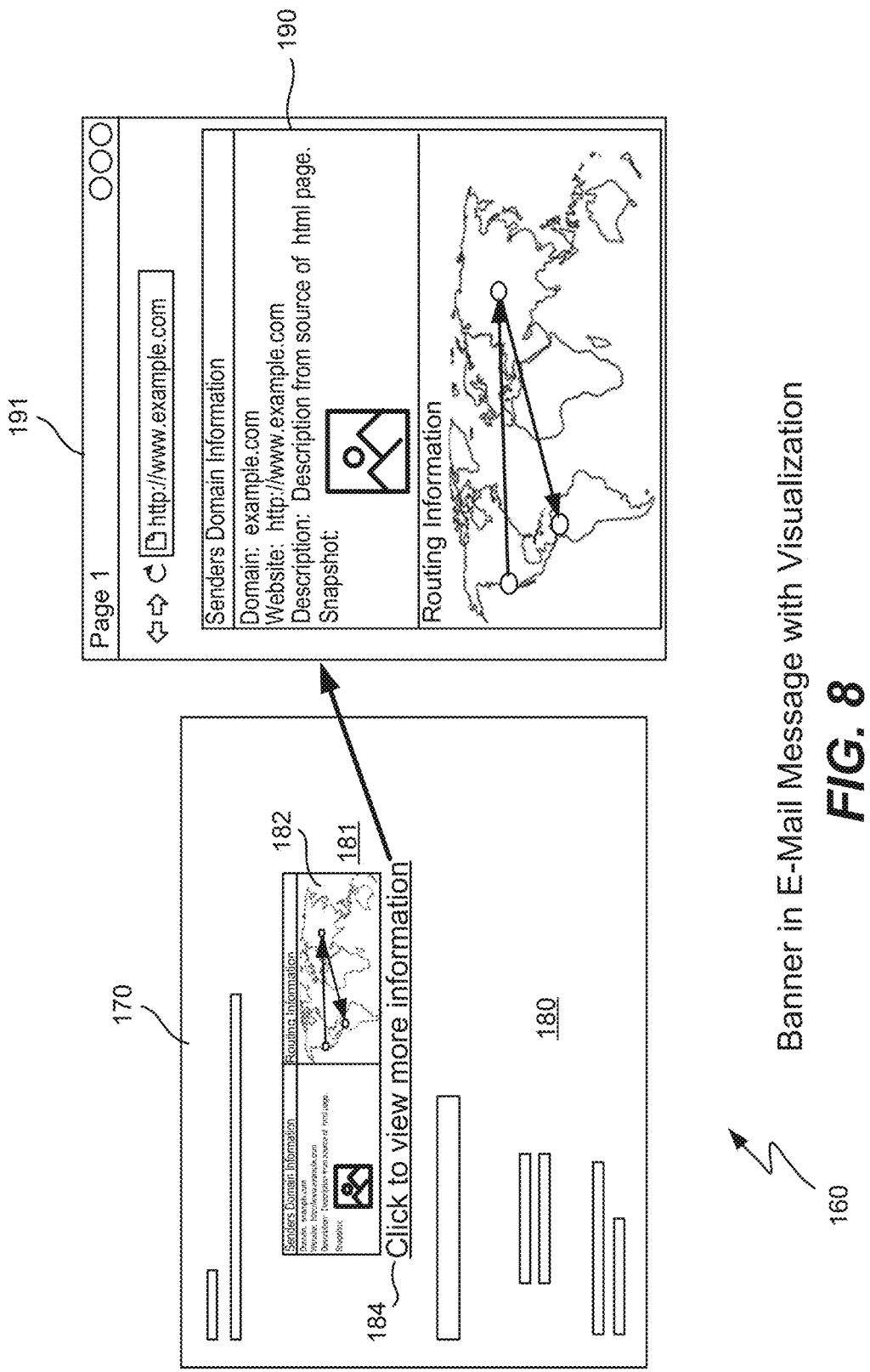
FIG. 8 illustrates how a banner may be displayed via an e-mail message using visualization.

FIG. 8 illustrates 160 how a banner may be displayed via an e-mail message using visualization. Shown is a program 170 displaying an e-mail message or messages for a user (which may be a browser accessing a Web mail server or an e-mail client executing upon the user computer) and an e-mail message 180 that a user has opened. Shown is a banner 181 which has been inserted into, attached to, or otherwise displayed within the body of the e-mail message 180. The banner may include any of a variety of information. By way of example, the banner includes visualization 182 which may be a thumbnail image (or larger image) of the visualization of FIG. 7, and may include a link 184 by way of which the user may obtain more information. For certain e-mail products which are able to receive, fetch and modify an e-mail message (such as E-mail Gateway Solution and other products based upon APIs of Office 365 and G Suite) the banner may be inserted and display image 182 as shown. For other e-mail programs or e-mail clients which do not allow an image to be displayed until specifically allowed by the user, link 184 is provided. When the user clicks upon URL link 184 this opens a new window or tab in a browser 191 which displays the visualization 190 (in case visualization 182 cannot be displayed).

As shown, e-mail message 180 may be blurred, obscured, rendered blank, rendered unreadable, or otherwise inaccessible to the user so that the user is required to view the banner information and make a decision about which action to take regarding the received e-mail message. Other ways may be used to render an e-mail message unreadable. By way of example, interactive email (a type of HTML e-mail) with a click-to-reveal may be used. We can hide the content and provide a button to reveal the content when pressed. But, it is optional to render the e-mail message inaccessible.

Once the recipient user views banner 181 he or she may make a decision about which action to take with regard to the received e-mail message such as deleting it.

On-Line Mode

Figure 9:
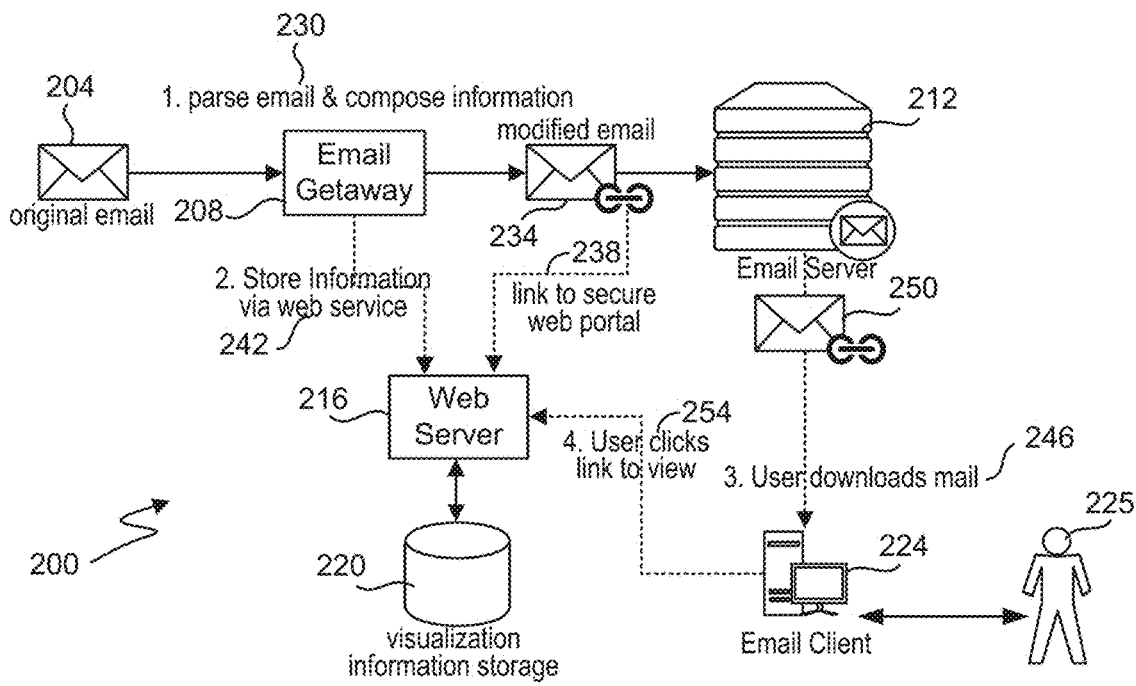
FIG. 9 provides an overview of an on-line mode using an E-mail Gateway Product.

FIG. 9 provides an overview of an on-line mode 200 using an E-mail Gateway Product. In this embodiment, the e-mail gateway adds the banner to the incoming e-mail message and may do so on-line, in real time as the message is received. This on-line mode may operate completely on the premises (or within the control) of a corporation or may operate as Software as a Service (SAAS), i.e., as a cloud service. First, the on-premises embodiment will be described.

Shown is an original e-mail message 204 coming from a sender e-mail address and intended for a recipient user. The message is received at e-mail gateway 208 which is a software product executing upon a suitable computer located under control of a particular corporation. By way of example, e-mail gateway is a server executing inside and at the edge of a corporate network within a corporate gateway computer, and may be part of another product such as the Trend Micro InterScan Messaging Security Gateway product.

E-mail server 212 is also software executing upon a suitable computer within a corporate network and is used to manage and distribute e-mail messages for users as is known in the art. Web server 216 is software executing upon a suitable computer within the corporate network which may be the same as or remote from the computer of gateway 208. Web server 216 provides a host for visualization information storing and viewing. For greater security, one may use HTTPS, along with Single Sign-On (SSO) using the user's Identity and Access Management (IAM) system on the Web server. With SSO, a user can log in once to access all corporate systems.

Visualization information storage 220 is a database used by Web server 216 for the storage of e-mail visualizations (such as 140, 190). Each visualization is particular to a received e-mail message and may be accessed using a link such as link 184 as is known to those of skill in the art. E-mail client 224 is e-mail client software executing upon a user computer allowing an individual to download, read, and respond to e-mail messages.

In operation, at 230 the e-mail message is received, is parsed and the visualization information is generated and composed. Next, at 234 the modified e-mail message (including banner 181) is delivered to the e-mail server 212. At 238 it is shown that the message has been modified to include a link from the e-mail message to the Web server 216 specifically to visualization information in database 220 which is particular to that e-mail message. Once 230 has completed, at 242 the visualization information may be stored using a Web service provided by Web server 216 into database 220. As mentioned above, this visualization information based on the received e-mail message is accessible via a link placed into modified e-mail message at 234.

At a later point in time, a user uses e-mail client 224 in order to access 246 the received e-mail message on his or her computing device. Shown at 250 is the modified e-mail message which may be opened or otherwise viewed on the user computing device. The user may then view banner 181 and take a particular action, or may choose to click upon link 184 in order to view the visualization information stored in database 220 for that particular e-mail message.

In the SAAS embodiment of this on-line mode, e-mail gateway 208, e-mail server 212 and Web server 216 are all part of a third-party cloud service to which a corporate client (including the user 225) subscribes, and are hosted in the cloud at a remote site. User 225 uses his or her computer 224 to download 246 an e-mail message and my do so using an e-mail client or a standard Web browser. Examples of SAAS providers include: Microsoft Office 365 and Google G Suite.

Off-Line Mode

Figure 10:
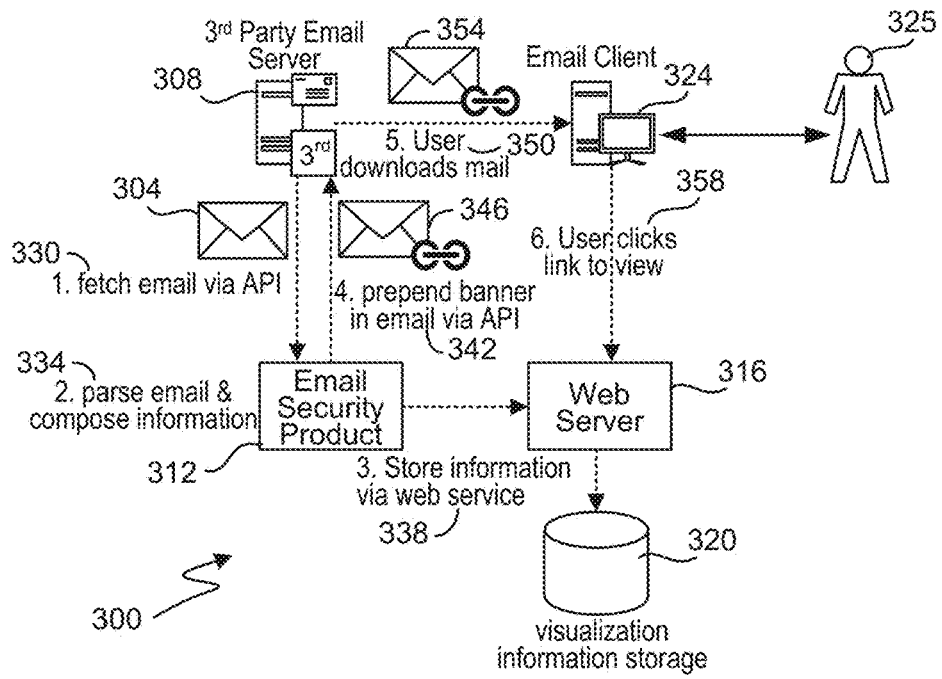
FIG. 10 provides an overview of an off-line mode using an e-mail security product and a third-party e-mail server.

FIG. 10 provides an overview of an off-line mode 300 using an e-mail security product and a third-party e-mail server. In this embodiment, the e-mail security product 312 adds the banner to a stored e-mail message and may do so off-line, via an API. This off-line mode may operate completely on the premises (or within the control) of a corporation or may operate as Software as a Service (SAAS), i.e., as a cloud service. Typically, third-party e-mail server 308 is not under control of the user's corporation and provides Web mail service, i.e., it is a software product executing upon a suitable computer located under control of a different corporation, for example. First, the on-premises embodiment will be described.

Shown is an original e-mail message 304 which has come from a sender e-mail address, intended for a recipient user, and is now stored at third-party e-mail server 308. E-mail security product 312 is also software executing upon a suitable computer on the corporate premises and is used to fetch and insert banners into e-mail messages using suitable API commands of server 308. Web server 316 is software executing upon a suitable computer on the corporate premises which may be the same or remote from the computer of product 312.

Web server 316 provides a host for visualization information storing and viewing. For greater security, one may use HTTPS, along with SSO using the user's IAM system on the Web server. Visualization information storage 320 is a database used by Web server 316 for the storage of e-mail visualizations (such as 140, 190). Each visualization is particular to a received e-mail message and may be accessed using a link such as link 184 as is known to those of skill in the art. E-mail client 324 is e-mail client software (e.g., a browser, custom software, etc.) executing upon a user computer allowing an individual to download, read, and respond to e-mail messages.

In operation, at 330 the e-mail message is fetched by product 312 from server 308, is parsed and the visualization information is generated and composed at 334. At 342 the banner is inserted into the e-mail message using an API command Next, at 346 the modified e-mail message (including banner 181) is delivered to the e-mail server 308. The message has been modified to include a link from the e-mail message to the Web server 316 specifically to visualization information in database 320 which is particular to that e-mail message. Once 334 has completed, at 338 the visualization information may be stored using a Web service provided by Web server 316 into database 320. As mentioned above, this visualization information based on the received e-mail message is accessible via a link placed into modified e-mail message at 342.

At a later point in time, a user uses e-mail client 324 in order to download 350 the modified e-mail message 354 to his or her computing device. Shown at 354 is the modified e-mail message which may be opened or otherwise viewed on the user computing device. The user may then view banner 181 and take a particular action, or may choose to click 358 upon link 184 in order to view the visualization information stored in database 320 for that particular e-mail message.

In the SAAS embodiment of this off-line mode, e-mail server 308, e-mail security product 312 and Web server 316 are all part of a third-party cloud service to which a corporate client (including the user 325) subscribes, and are hosted in the cloud at a remote site. User 325 uses his or her computer 324 to download an e-mail message and may do so using an e-mail client or a standard Web browser. Examples of SAAS providers include: Microsoft Office 365 and Google G Suite.

Add Banner to E-Mail Message in On-Line Mode

Figure 11:
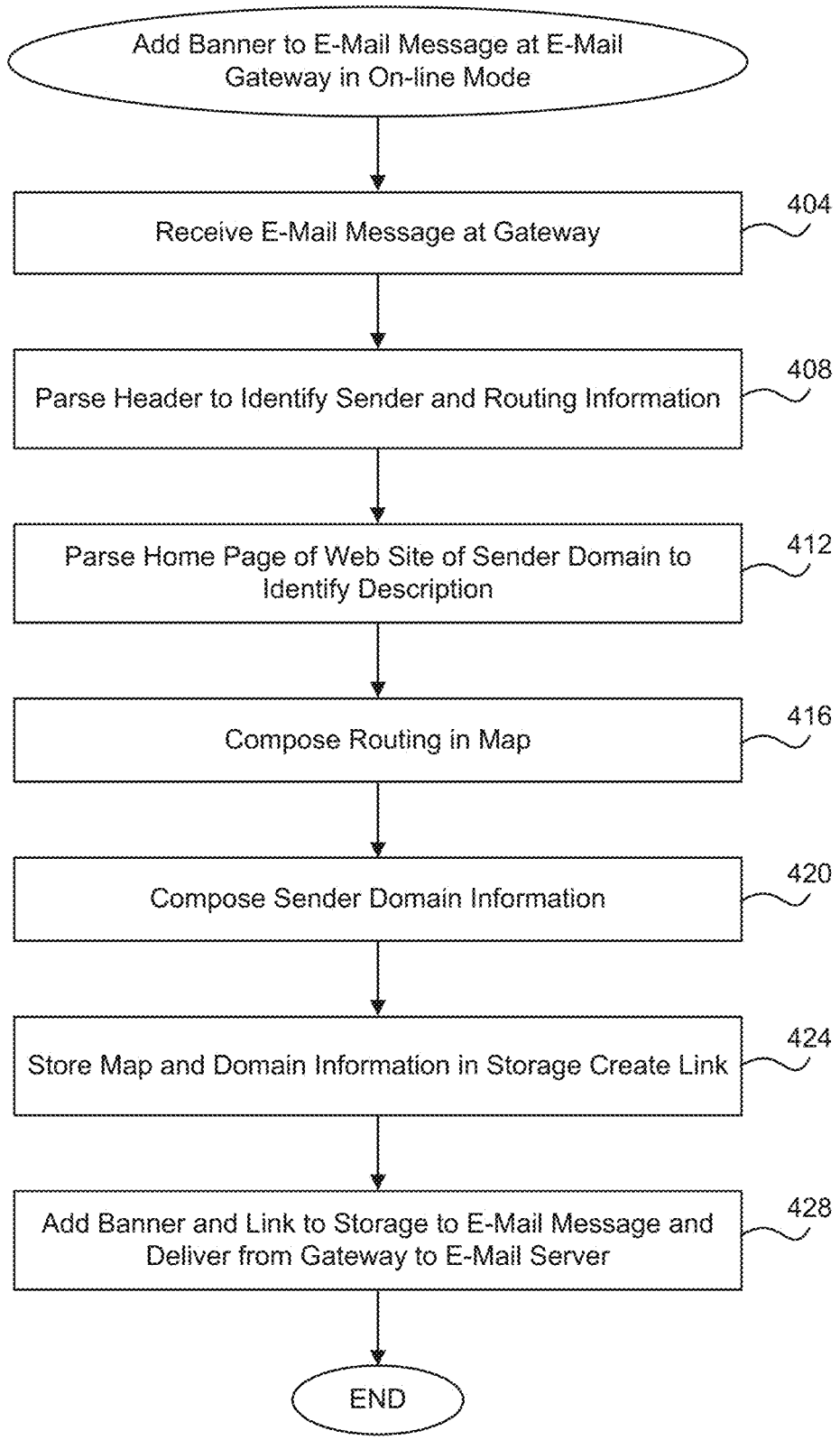
FIG. 11 provides the workflow occurring in the e-mail gateway in an on-line mode.

FIG. 11 provides the workflow occurring in the e-mail gateway in an on-line mode. Thus, based upon the inserted banner, the user can easily view the above information in a visual representation and make an informed decision based on this information and their own knowledge.

In a first step 404 an e-mail message is received at an e-mail gateway and processing may begin upon that e-mail message in real time as the message is received. Indeed, every received e-mail message may be processed in real-time as it is received. In a next step 408 the header of the received e-mail message (such as header 32) is parsed to identify not only the sender and the sender domain, but also the routing information of that e-mail message. An example of how to identify the sender domain and Web site of a received e-mail message and a determination of routing information is described above in FIG. 2. FIG. 2 shows that routing information includes IP addresses of server computers (indicating location) and whether or not a connection is encrypted.

Next, in step 412, the home page of the Web site of the sender domain is parsed in order to identify information such as a description of the entity, a snapshot included within the home page and other information. Details are provided in FIG. 4 above.

Next, in step 416 a graphic illustration of the routing information is composed in a map such as is described and shown above in FIGS. 3, 7 and 8. In step 420 the sender domain information is also composed into a visual representation such as is described and shown above in FIGS. 5, 6, 7 and 8. Representation of this visual information in steps 416 and 420 may be performed using software and techniques such as: retrieving the location by IP address using the "IP2Location" database; displaying a location on a map using the "Leaflet" software; and fetching and taking a snapshot of a home page using the "PhantomJS" software.

In step 424 the e-mail gateway 208 stores the map and domain information into storage 220 using Web server 216. Preferably, a Web service API is used which will respond with a link (typically a URL) identifying the stored map and information within storage 220. Typically, storage 220 or 320 stores the information as a key-value pair, where the key is a URL or other unique identifier and the value is the routing map and sender domain information. Next, in step 428 this map, domain information and link is added as a banner into the received e-mail message and that modified e-mail message is delivered from the gateway to the e-mail server 212, again, all occurring in real time. Typically, HTML code is used to add this information. The user may thus access or download this message in real time from his or her computer.

Add Banner to E-Mail Message in Off-Line Mode

Figure 12:
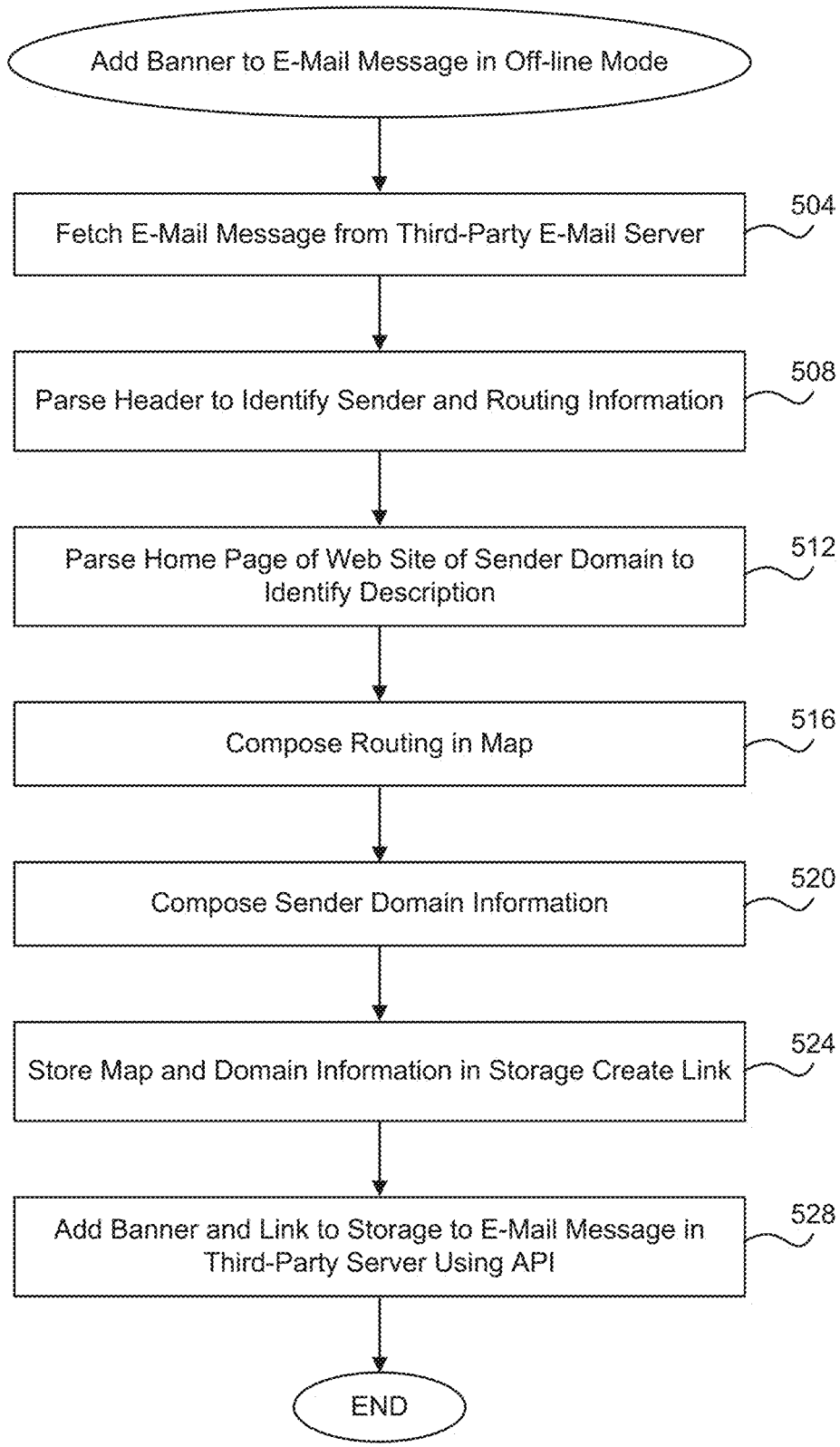
FIG. 12 provides the workflow occurring in the e-mail security product in an off-line mode.

FIG. 12 provides the workflow occurring in the e-mail security product 312 in an off-line mode. Thus, based upon the inserted banner, the user can easily view the above information in a visual representation and make an informed decision based on this information and their own knowledge.

In a first step 504 an e-mail message is fetched from server 308 using an API of that server in an offline mode, some time after that message is received at server 308, i.e., not in real time. Processing may begin upon that e-mail message any time after the message is received. Indeed, every received e-mail message may be processed some time after it is received. In a next step 508 the header of the received e-mail message (such as header 32) is parsed to identify not only the sender and the sender domain, but also the routing information of that e-mail message. An example of how to identify the sender domain and Web site of a received e-mail message and a determination of routing information is described above in FIG. 2. FIG. 2 shows that routing information includes IP addresses of server computers (indicating location) and whether or not a connection is encrypted.

Next, in step 512, the home page of the Web site of the sender domain is parsed in order to identify information such as a description of the entity, a snapshot included within the home page and other information. Details are provided in FIG. 4 above.

Next, in step 516 a graphic illustration of the routing information is composed in a map such as is described and shown above in FIGS. 3, 7 and 8. In step 420 the sender domain information is also composed into a visual representation such as is described and shown above in FIGS. 5, 6, 7 and 8. Representation of this visual information in steps 416 and 420 may be performed using software and techniques such as is described above.

In step 524 the e-mail product 312 stores the map and domain information into storage 320 using Web server 316. Preferably, a Web service API is used which will respond with a link (typically a URL) identifying the stored map and information within storage 320. Typically, storage 220 or 320 stores the information as a key-value pair, where the key is a URL or other unique identifier and the value is the routing map and sender domain information. Next, in step 528 this map, domain information and link is added as a banner into the received e-mail message using an API of server 308 which allows messages to be modified at the server 308. Typically, HTML code is used to add this information. The server 308 is not allowed to download message 354 to the user computer until processing in step 528 is completed. In one example, a system administrator configures a policy to achieve that result. Thus, the system holds an e-mail message in a specific folder (not accessible by the user) until processing is completed; the security product accesses such a folder, and then moves the message to the user's accessible folder. In another technique, the third party server has a subscription mechanism and it will notify the security product when a new message is received. Then, the security product fetches and processes the new message. In this implementation, however, the user may access the original message before the security product is finished processing and modifying the original message. The user may thus download this message from his or her computer once processing in step 528 is completed in this off-line mode.

Display Banner in E-Mail Message to User

Figure 13:
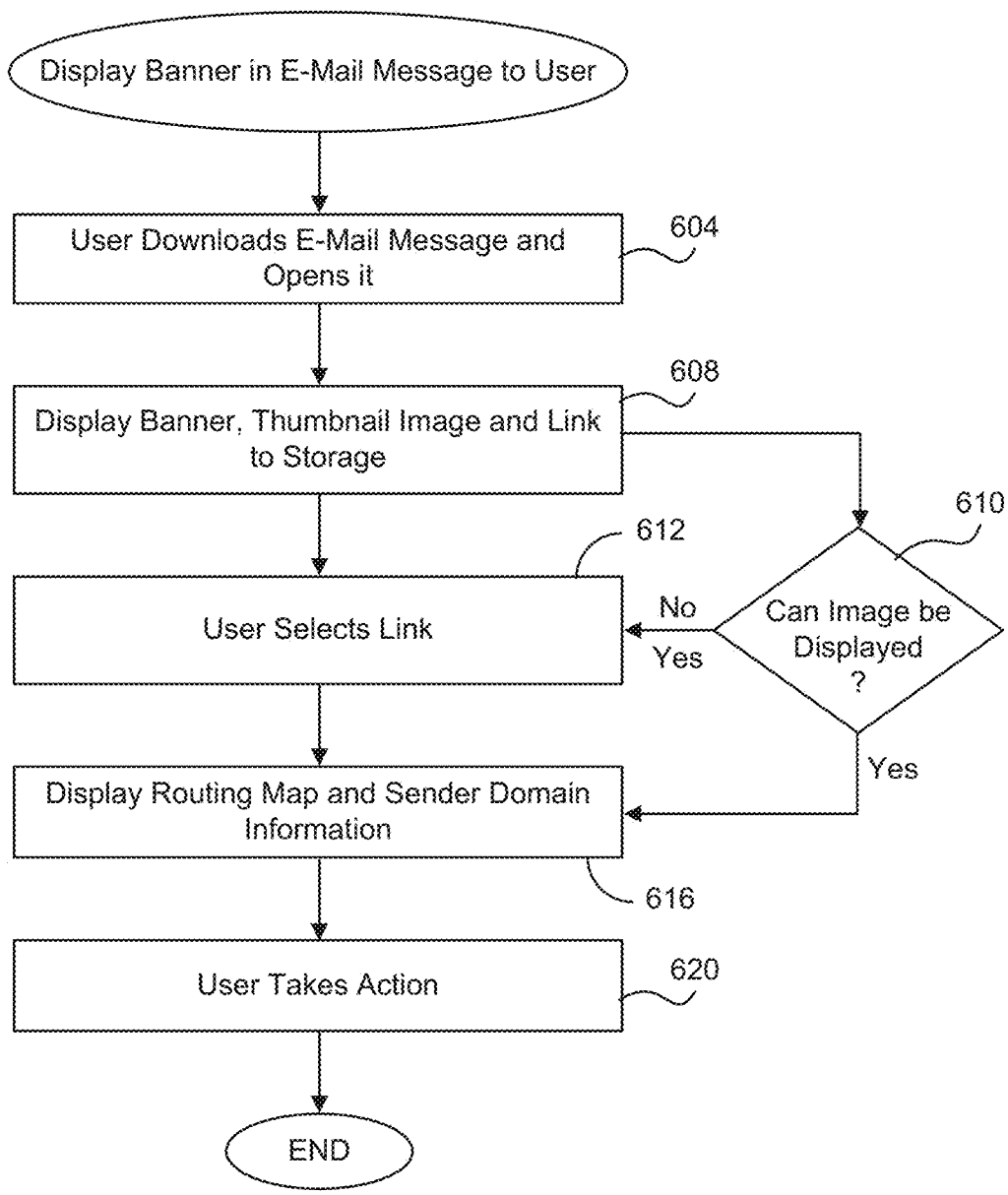
FIG. 13 is a flow diagram describing one embodiment by which a banner is displayed to a user within an e-mail message.

FIG. 13 is a flow diagram describing one embodiment by which a banner is displayed to a user within an e-mail message. In a first step 604 the user (i.e., user 225 or 325) using an e-mail client 224 or 324 (or any standard browser) opens an e-mail message (by selecting it, clicking it, etc.). The user may be downloading e-mail messages from an in-the-cloud service using a standard browser, may be using an e-mail client to download such messages, or may be using an e-mail client on his or her computer to access messages from an on-premises e-mail server.

In step 608 the banner is displayed within the e-mail message. The banner includes link 184 and optionally image 182. If the e-mail client or browser allows images to be displayed then image 182 will be displayed, otherwise, only the link 184 may be present.

If the thumbnail image 182 can be displayed, then in step 610 it is determined to move control to step 616 and the routing map and sender domain information is displayed in banner 181 as shown in FIG. 8. If the e-mail client does not allow an image to be displayed, then step 610 moves control to step 612 in which case the user may select link 184 in order to display the routing map and sender domain information in step 616. Of course, even if the thumbnail image can be displayed in step 610, the user still may decide to select the link in step 612.

In step 612 when the user selects link 184, then the routing map and sender domain information will be displayed as a Web page in a tab of the user's browser (which may open automatically upon selecting link 184). Typically, both banner 181 and the routing map and sender domain information stored in storage 220 or 320 are stored in HTML format, thus facilitating their display not only within e-mail message 180 but also within browser 191.

FIG. 8 illustrates how such a banner appears when a user clicks upon the received e-mail message. Standard techniques, based upon the MIME format of an e-mail message, may be used to insert the banner into the body of the e-mail message, and it is preferably inserted at the beginning of the body so that it catches the user's attention when opened. As shown in FIG. 8, the e-mail message 170 may optionally be obscured, and the banner includes a thumbnail image 182 of the map and sender domain information (if allowed), as well as a link 184 to this stored information. Browser 191 and tab 190 shows the visual information if link 184 is used.

In step 620 the user may review banner 181 or visual information 190, and make a decision as to whether the e-mail message is suspicious or not. If deemed suspicious, the user may take an action such as deleting the e-mail message, moving it to a junk mail folder, marking it as spam, or other action. If the visual information indicates that the e-mail message may be legitimate, then the user may treat the e-mail message in the normal course of business and read it, act upon it, or click another link within it.

Computer System Embodiment

Figure 14A:
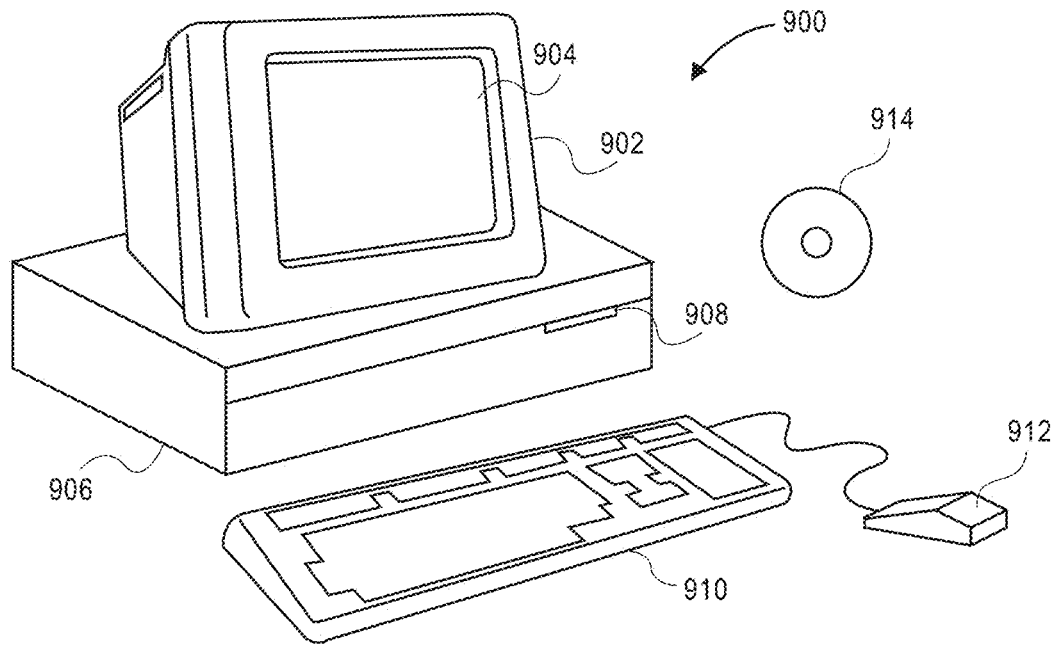
FIGS. 14A and 14B illustrate a computer system suitable for implementing embodiments of the present invention.
Figure 14B:
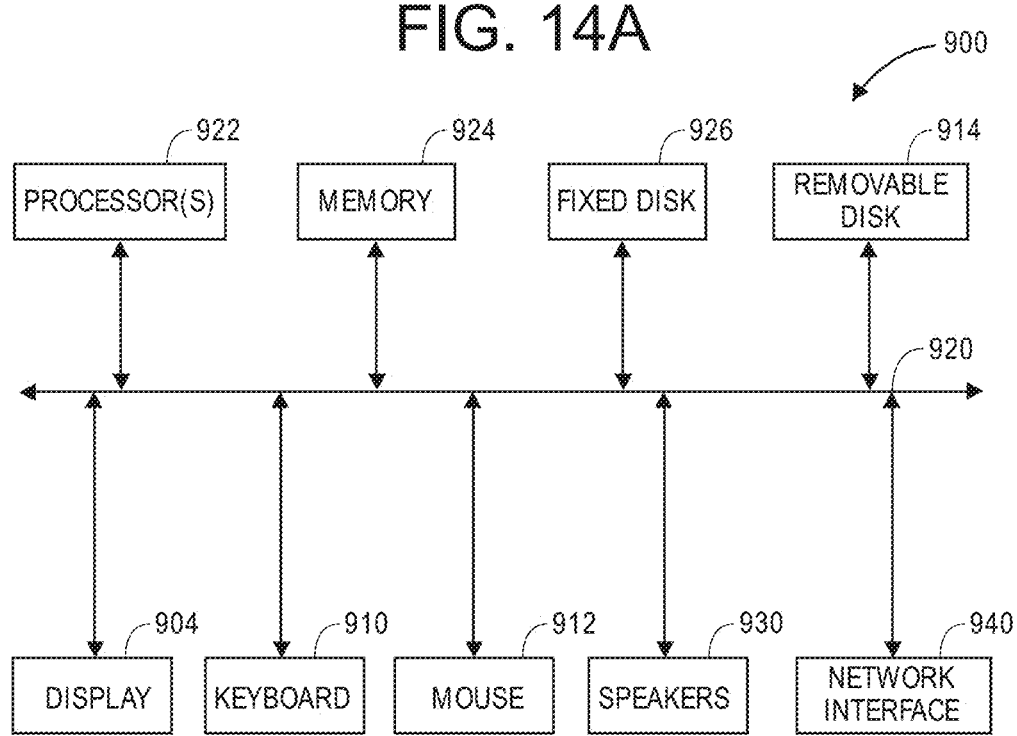

FIGS. 14A and 14B illustrate a computer system 900 suitable for implementing embodiments of the present invention. FIG. 14A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 14B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM are used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of inserting visual information into an e-mail message in real time, said method comprising:

receiving at an e-mail gateway server within a corporate network an e-mail message;

parsing a header of said e-mail message to determine geographic locations of server computers through which said e-mail message has traveled from a sender;

composing said geographic locations into a routing map showing a path of said e-mail message from said sender;

inserting a banner into said e-mail message that includes said routing map or a link to said routing map in order to modify said e-mail message;

storing said banner by said e-mail gateway server at a storage location identified by said link;

delivering said modified e-mail message from said e-mail gateway server to an e-mail server of said corporate network in real time;

delivering said modified e-mail message from said e-mail server to a user computer in real time and displaying said routing map in said banner of said modified e-mail message on a display of said user computer;

rendering said modified e-mail message inaccessible on said display of said user computer; and displaying said modified e-mail message on said display of said user computer only after a selection is received from a user of said user computer to reveal the contents of said modified e-mail message.

2. A method of inserting visual information into an e-mail message in real time, said method comprising:

receiving at an e-mail gateway server within a corporate network an e-mail message;

parsing a header of said e-mail message to determine geographic locations of server computers through which said e-mail message has traveled from a sender;

composing said geographic locations into a routing map showing a path of said e-mail message from said sender;

parsing said header of said e-mail message to determine encrypted paths between said computers by identifying an encryption cipher used in each of said each encrypted paths;

inserting said encrypted paths visually in said routing map;

inserting a banner into said e-mail message that includes said routing map or a link to said routing map in order to modify said e-mail message;

storing said banner by said e-mail gateway server at a storage location identified by said link; and delivering said modified e-mail message from said e-mail gateway server to an e-mail server of said corporate network in real time.

* * * * *